United States Patent Office.

GEORGE A. CLOWES, OF NEEDHAM MARKET, ENGLAND, ASSIGNOR OF TWO-THIRDS TO MORITZ PAUL HATSCHEK AND LAWRENCE BRIANT, OF LONDON, ENGLAND.

MALTED BREAD AND METHOD OF PREPARING SAME.

SPECIFICATION forming part of Letters Patent No. 579,739, dated March 30, 1897.

Application filed May 27, 1896. Serial No. 593,318. (No specimens.) Patented in England September 20, 1895, No. 17,590.

*To all whom it may concern:*

Be it known that I, GEORGE ARCHIBALD CLOWES, a subject of the Queen of Great Britain, residing at Needham Market, in the county of Suffolk, England, have invented certain new and useful Improvements in the Manufacture of Bread, Cakes, and other Similar Food, (for which I have obtained Letters Patent in Great Britain, No. 17,590, dated September 20, 1895;) and I do hereby declare that the following is a full, clear, and exact description of the invention, which will enable others skilled in the art to which it appertains to make and use the same.

Heretofore a certain proportion of flour prepared from ordinary brewers' malt has been combined with ordinary flour in the manufacture of bread, with a view to imparting a pleasant and distinct malt flavor to the bread to which such malt-flour has been added, thus enabling it to be termed "malt-bread." Malt capable of imparting this distinct malt flavor differs, as will be hereinafter shown, materially from my malt-flour, which imparts no distinctive malt flavor, which malt flavor can only be satisfactorily imported into bread designated "malt-bread," but would not be applicable or desirable in ordinary bakers' household bread. Malt extract of high diastasic value has also been combined with ordinary flour in the manufacture of bread, but in either case the malt-flour or malt extract did not possess, in addition to the ordinary diastase, certain enzyms, which are lost in the method of preparing ordinary brewers' malt or malt extract, but which do exist in the malt or malt-flour which I use. The use of malt-flour prepared from ordinary brewers' malt has not, however, been attended with very marked success. Some malt extracts, however, have been found to give good results, but, unlike my diastasic malt-flour, cannot be added to ordinary flour in its dry condition.

I have discovered that by using a malt-flour made from a specially-prepared malt giving seventy degrees or more of diastasic value, as determined by Lintner's process, and containing peptase, as also appreciable amounts of the cellulose-dissolving enzym—cytase— which enzym has been, so far as I am aware, non-existent in malt-flour used for baking purposes, such malt-flour, when added to ordinary flour in the manufacture of bread or other like food, produces an improved quality of bread or other food superior to that obtained either by the use of ordinary malt-flour or by the use of malt extract. I have also discovered that malt-flour made from the said specially-prepared malt, containing, as it does, soluble albuminous matter in the form of diastase, peptase, cytase, &c., acts as a food to the yeast employed in bread-making, stimulating it much more than malt extract and thus hastening the process of fermentation in a proportionate degree.

I am aware that malt of the character proposed to be used by me in the manufacture of diastasic malt-flour has hitherto been prepared for the use of distillers, but such has not to my knowledge been heretofore used in the form of flour in the manufacture of bread and the like.

The special malt I employ is prepared in a known manner, namely, by using suitable English or foreign barley, wheat, rye, oats, maize, or other cereals or seeds containing and capable of developing diastase, cytase, &c., which grain or seed is steeped for from fifty to seventy hours and afterward submitted to rapid germination. This rapid germination is encouraged by copious supplies of water sprinkled on the germinating barley, wheat, rye, oats, maize, or other cereals or seeds, thus encouraging the development of the before-mentioned enzyms, which are carefully retained in the process of drying in the kiln by submitting the malt to a slowly-progressive heat, which at the end of the drying-period does not exceed 120° Fahrenheit. Malt dried at temperatures below the above heat has practically no flavor of malt, and consequently could not be used to impart a malt flavor to bread. To acquire such a malt flavor, the malt would have to be submitted to a temperature of not less than 160° Fahrenheit, at which temperature cytase would long before have entirely disappeared, while diastase would be distinctly crippled in its power to convert starch into maltose. The malt I propose to use has no flavor of malt in itself, but has the power, by the presence of the before-mentioned enzyms—diastase, cytase, &c.—to produce a marked sweetness and moisture in bread.

The malt prepared as above stated is reduced to flour by grinding in a suitable mill and the bran removed by sifting out to the extent of about one-fifth or more of the original weight of the malt.

Malt-flour has heretofore been employed only in large proportions, so as to impart a malty flavor to the bread. By the use of the flour herein described I am able to replace in wheat-flour all the valuable constituents of the wheat-germ which is eliminated in the now universally-used roller-milling process, besides some properties which are not contained in the wheat-germ. Thus bread baked with the admixture of the malt-flour described closely resembles that baked from old stone-flour, which contained the whole wheat-germ, especially as far as palatability and nutritive and digestive qualities are concerned, while possessing the same white color.

In the manufacture of my improved bread or other like food the malt-flour, as above prepared, may be added to the "ferment" prepared by some bakers at the time that such is set to work. When this process is not resorted to, the malt-flour may be carefully mixed with the sponging or doughing liquor or water, wherein it should be occasionally stirred, or it may be added by the miller or baker either in the course of milling operations or when blending the various flours required by the baker. The quantity of malt-flour to be used is one pound to the sack (two hundred and eighty pounds) of millers' flour, but this proportion may be varied according to the requirements of the baker or the quality of flour used. This small proportion of malt-flour to millers' flour is rendered possible by the high value of the enzyms contained in the malt-flour, the one pound of malt-flour replacing six pounds of wheat-germ taken out of the two hundred and eighty pounds of wheaten flour by the roller-milling process. Heretofore one part of ordinary malt-flour was added to from fifteen to twenty parts of wheaten flour, thus imparting a strong malty flavor to the bread without achieving the same results as those derived from the use of the malt-flour described. The heat of the ferment or of the sponging or doughing liquor or water should never exceed 100° Fahrenheit in order to insure the beneficial action of the enzyms above referred to.

Having fully described my invention, what I desire to claim and secure by Letters Patent is—

1. The herein-described improvement in the method for preparing malted bread, &c., consisting in mixing with ordinary flour, or dough, a malt-flour of high diastasic value and containing cytase.

2. A malted bread, &c., having no distinctive flavor of malt, and composed of ordinary flour and a malt-flour of high diastasic value and containing cytase, substantially as described.

GEORGE A. CLOWES.

Witnesses:
CHAS. R. STEWARD,
GEO. JACOB.